United States Patent
Hamkins et al.

(10) Patent No.: US 6,640,834 B1
(45) Date of Patent: Nov. 4, 2003

(54) ELECTROHYDRAULIC VALVE FOR CONTROLLING A CAM SHAFT PHASING MECHANISM OF AN INTERNAL COMBUSTION ENGINE

(75) Inventors: Eric P. Hamkins, Waukesha, WI (US); Edward A. Flynn, Pewaukee, WI (US)

(73) Assignee: Husco International, Inc., Waukesha, WI (US)

( * ) Notice: Subject to any disclaimer, the term of this patent is extended or adjusted under 35 U.S.C. 154(b) by 0 days.

(21) Appl. No.: 10/213,194

(22) Filed: Aug. 6, 2002

(51) Int. Cl.[7] .............................. A44B 9/00; F01L 9/02; F16K 31/02
(52) U.S. Cl. ............................ 137/625.65; 123/90.12; 251/129.1
(58) Field of Search .................. 123/90.12, 90.15; 137/625.65; 251/129.09, 129.1, 129.15

(56) References Cited

U.S. PATENT DOCUMENTS

| | | | |
|---|---|---|---|
| 5,259,414 A | * | 11/1993 | Suzuki .................. 137/625.65 |
| 5,535,783 A | * | 7/1996 | Asou et al. ............. 137/625.65 |
| 6,371,164 B2 | * | 4/2002 | Sakata et al. .......... 137/625.69 |

OTHER PUBLICATIONS

Delphi Automotive Systems brochure for a "Variable Cam Phaser (VCP) Vane," Copyright 1999.

* cited by examiner

*Primary Examiner*—Thomas Denion
*Assistant Examiner*—Jaime Corrigan
(74) *Attorney, Agent, or Firm*—George E. Haas; Quarles & Brady LLP

(57) ABSTRACT

A solenoid operated valve has a valve body with a plurality of ports and a spool slidable within the body to interconnect the ports in different combinations. A solenoid, which is coupled to drive the spool, has a coil wound on an annular bobbin with a tube of an electrically conductive, non-magnetic metal within the bobbin. A first pole piece extends into one end of the tube and a second pole piece extends into another end of the tube. A separate bushing is located in an aperture in each pole piece. Each bushing has a tubular body with a first end section that has a larger outer diameter than a second end section and the second end section that has a smaller inner diameter than the first end section. The solenoid further includes an armature that is slidably received in the bushings and engaging the spool.

23 Claims, 2 Drawing Sheets

ELECTROHYDRAULIC VALVE FOR CONTROLLING A CAM SHAFT PHASING MECHANISM OF AN INTERNAL COMBUSTION ENGINE

CROSS-REFERENCE TO RELATED APPLICATIONS

Pot Applicable

STATEMENT REGARDING FEDERALLY SPONSORED RESEARCH OF DEVELOPMENT

Not Applicable

BACKGROUND OF THE INVENTION

1. Field of the Invention

The present invention relates to hydraulic control valves for controlling flow of a fluid in an internal combustion engines, and more particularly to electrohydraulic valves for operating a mechanism which varies the phase relationship between a cam shaft and a crankshaft of the engine.

2. Description of the Related Art

Internal combustion engines have a plurality of cylinders containing pistons that are connected to a crankshaft. Each cylinder has two or more valves to control the flow of a fuel mixture into the cylinder and the flow of exhaust gases there from. Traditionally the valves were controlled by a cam shaft which in turn was mechanically connected to rotate with the rotation of the crankshaft. Gears, chains, or belts were used to couple the crankshaft to the cam shaft so that the two would rotate in unison. It is important that the valves open and close at the proper times during the combustion cycle within each cylinder. Heretofore, that timing relationship was fixed by the mechanical coupling between the crankshaft and the cam shaft.

The setting of the cam shaft timing often was a compromise which produced the best overall operation at all engine operating speeds. However, it was recognized that optimum engine performance could be obtained if the valve timing was varied as a function of engine speed, engine load and other factors. With the advent of computerized engine control, it became possible to determine the optimum engine valve timing based on the operating conditions occurring at any given point and time. With reference to FIG. 1, the engine computer determines the optimum valve timing and issues a signal to an electrohydraulic valve 10 which controls the flow of pressurized engine oil from a pump to a cam phase adjustment mechanism 12. The adjustment mechanism 12 couples the cam shaft 14 to a pulley or other mechanism that is connected to the engine crankshaft. By controlling the application of engine oil to either of two ports 18 or 19 of the adjustment mechanism, the phase relationship between the rotating pulley 16 and the cam shaft 14 can be varied. For example, application of engine oil from the pump to the first port 18 and exhausting engine oil from the second port 19 to the tank advances the valve timing. Whereas connecting the second port 19 of the adjustment mechanism 12 to the pump and coupling the first port 18 to the tank retards the valve timing. The hydraulic valve 10 is a proportional type valve which allows the amount that the cylinder valves are advanced or retarded to be proportionally varied by metering the flow of engine oil to and from the adjustment mechanism 12. A sensor 15 provides an electrical signal indicating the angular phase of the cam shaft.

Key to the operation of the variable cam shaft is the proper control of engine oil to the two port 18 and 19 and accurately metering that engine oil. Thus the control valve 10 becomes a critical element in the proper operation of the engine.

SUMMARY OF THE INVENTION

An electrohydraulic control valve includes a tubular valve body that has a longitudinal bore there through forming an outlet port at one end of the valve body. A first port, a second port and an inlet port extend transversely through the body and communicate with the longitudinal bore. A spool is slidably received within the bore of the valve body and has an aperture extending from an end of the spool that is proximate to the one end of the valve body to a point proximate an opposite end of the spool. The spool includes an notch in an exterior surface. A spring biases the spool away from the one end of the valve body.

An actuator comprises a solenoid coil wound on an annular bobbin with a tube of an electrically conductive, non-magnetic metal within the bobbin. A first pole piece of the actuator extends into one end of the tube and a second pole piece extends into another end of the tube. A first bushing is located in an aperture in the first pole piece and a second bushing is in another aperture in the second pole piece. Each of the first and second bushings has a tubular body with a first end section with a larger outer diameter than a second end section. The outer diameter of the first end section engages the respective pole piece. The second end section of each bushing has a smaller inner diameter than the first end section. The actuator also includes an armature is slidably received in the first and second bushings and engaging the spool.

The spool moves to several positions within the valve body depending upon the net force resulting from interaction of forces from the spring and the armature. In a first position the spool notch provides a first fluid path between the first port and the inlet port, and a second fluid path is provided between the second port and the outlet port. When the spool is at a second position, the notch provides a fourth fluid path between the inlet port and the second port and the aperture provides a fifth between the first port and the outlet port.

In an intermediate position of the spool, between the first and second positions, the outlet port is disconnected from the first and second ports. The notch can be manufactured to have one of several sizes to alter the connection provided in the intermediate position. A relatively short notch while being located adjacent to the inlet port does not extend to either the first or second ports. Therefore the first and second port are closed in the intermediate position. A relatively long notch forms a third fluid path that simultaneously connects the first port, the second port and the inlet port when the spool is in the intermediate position.

DETAILED DESCRIPTION OF THE INVENTION

Figure 1:
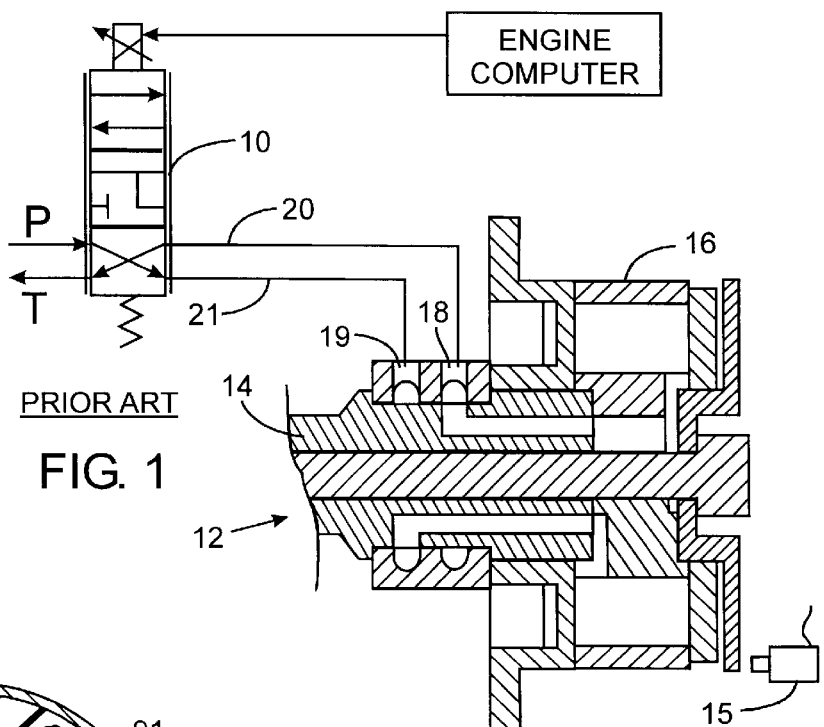
FIG. 1 is a schematic diagram of a variable cam adjustment system in which the present hydraulic valve may be employed.
Figure 2:
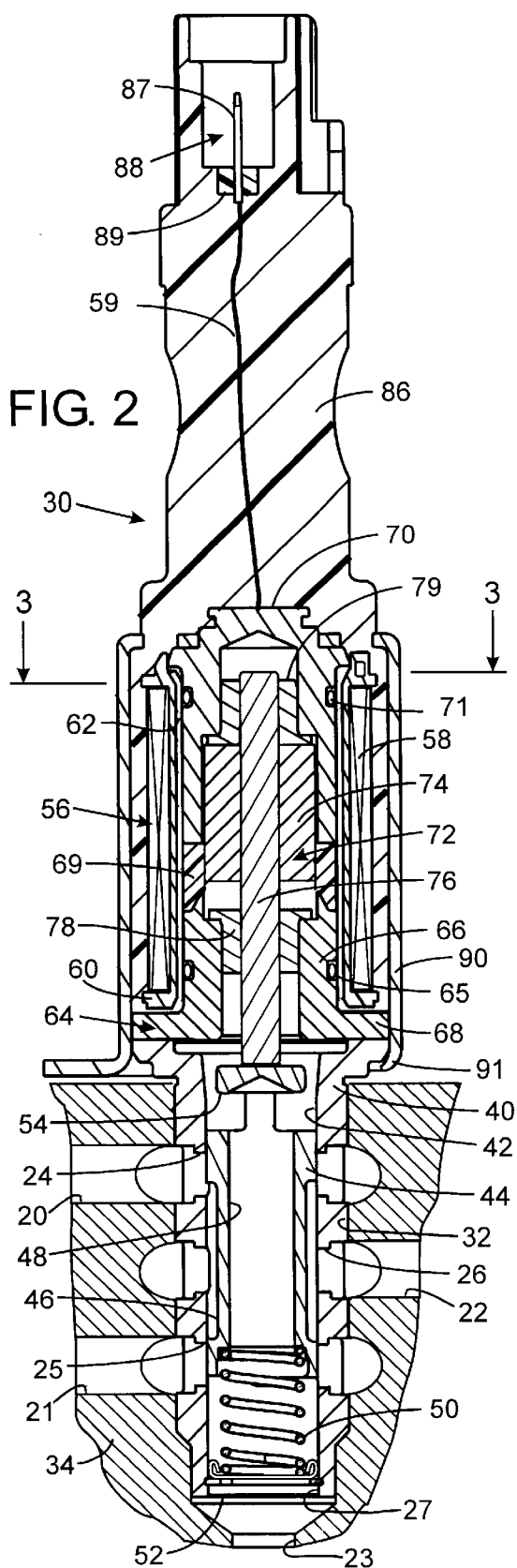
FIG. 2 is a longitudinal cross section view through an electrohydraulic valve according the present invention.

With reference to FIG. 2, an electrohydraulic control valve 30 is illustrated inserted into an aperture 32 in a manifold 34 of a variable cam phase adjustment mechanism. The ports 18 and 19 of the cam phasing mechanism 12 illustrated in FIG. 1 are connected respectively to two passages 20 and 21 that extend through the manifold 34 with those passages communicating with the aperture 32. A supply passage 22 extends between the oil pump and the manifold aperture 32, while a return passage 23 at the interior end of the aperture 32 leads to the oil pan of the engine.

The electrohydraulic valve 30 has a tubular valve body 40 with a longitudinal bore 42 and transverse openings which provide ports between the manifold passages and the longitudinal bore. Specifically a first port 24 connects to the first passage 18 and a second port 25 communicates with the second passage 21. An inlet port 26 in the valve body is associated with the supply passage 22 and an outlet port 27 opens into the return passage 23.

A spool 44 is slidably received within the bore 42 of the valve body 40 and has an exterior annular notch 46 which, in selective positions of the spool, provides a fluid path between different ones of the ports and thus between the manifold passages. A central aperture 48 extends between the opposite ends of the spool 44. A spring 50 biases the inward end of the spool 44 away from the interior end 52 of the valve body 40. The outward end of the valve spool 44 has a head 54.

The valve 30 further includes an electrical actuator 56 comprising a solenoid coil 58 wound on a non-magnetic bobbin 60, preferably formed of a plastic. The coil is driven by a pulse width modulated (PWM) signal having a duty cycle that is varied to position the spool 44 in the valve body 40. A copper or brass liner tube 62 extends within and along substantially the entire length of the bobbin 60. The liner tube 62 acts as a shading coil, thereby changing the input impedance characteristic of the solenoid coil 58 to be more like a resistor and less like an inductor. As a result when a clamping type suppression diode in used in the electronic circuit that drives the solenoid coil 58, the liner tube 62 linearizes the relationship between the duty cycle of the PWM driving signal and the RMS current of that signal. This improves the controllability of the solenoid current and thus the position of the armature 72 and valve spool 44. A magnetically conductive C-pole piece 64 has a cylindrical section 66 which extends into one end of the bobbin and the copper tube. An O-ring 65 provides a fluid tight seal between the C-pole piece 64 and the liner tube 62. The C-pole piece 64 has a flange 68 which projects outwardly from the cylindrical section 66, extending across the outward end of the valve body 40. An end-pole piece 70 extends into the opposite end of the bobbin 60 and has an interior end within the bobbin that is spaced from the C-pole piece 66. A spacer 69 of non-magnetic material is between the two pole pieces 68 and 70. Another O-ring 71 provides a fluid tight seal between the end-pole piece 70 and the liner tube 62 within the bobbin.

A moveable armature 72 of the actuator 56 is within the bobbin and includes an armature cylinder 74 of magnetic material with an aperture through which a push pin 76 pressed fitted. The push pin 76 projects through a central aperture in the C-pole piece 64 and is slidably supported therein by a first bushing 78. The head 54 of the valve spool 44 abuts the inner end of the push pin 76. The push pin 76 also extends into an aperture in the end-pole piece 70 in which the push pin is supported by a second bushing 79.

Figure 4:
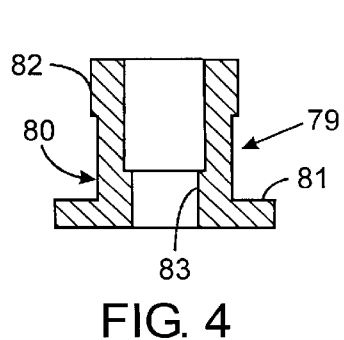
FIG. 4 is a cross section view of a bushing in the electrohydraulic valve.
Figure 5:
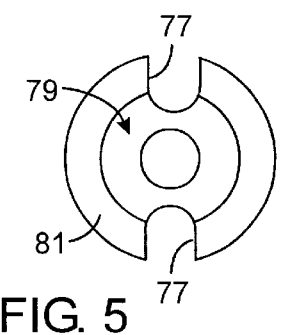
FIG. 5 is a top view of the bushing.
Figure 6:
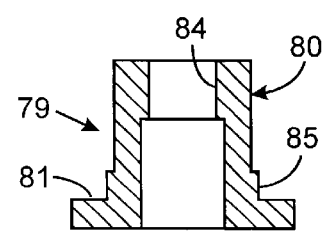
FIG. 6 is a cross section view of an alternative bushing.

The first and second bushings 78 and 79 are fabricated of aluminum bronze and have similar tubular constructions with the detail of the second bushing being illustrated in FIGS. 4 and 5. Specifically, the second bushing 79 has a tubular body 80 extending from a flange 81 which prevents the armature cylinder 74 from striking the end-pole piece 70. A pair of slots 77 extend along the outer surface of the body 80 to provide paths for fluid displaced by movement of the armature 72 to vent between both side of the bushing 79. The tubular body 80 has an enlarged outer diameter first end section 82 which engages the inner surface of the aperture in the end-pole piece 70. The inner diameter of the first end section 82 is substantially larger than the outer diameter of the push pin 76 so that contact does not occur between those components. The opposite end of the bushing's tubular body 80 has a smaller inner diameter second end section 83 which engages the outer surface of the push pin 76. The two different diameter end sections 82 and 83 are spaced apart longitudinally on the second bushing 79, i.e. the firs. end section 82 does not extend into the second end'section 83. Therefore, radially directed forces applied to the bushing upon being pressed into the aperture in the end-pole piece 70 do not deform the bushing to an extent that contact is made with the push pin 76. Such compression forces are limited to the larger diameter first end section 82 and are not be transmitted to the second end section 83 which is in contact with the push pin 76. This facilitates assembly of the valve without concern that deformation of the bushing may adversely affect subsequent movement of the push pin 76. This force isolation function also is provided by the alternative design of the second bushing shown in FIG. 6. In this alternative, the first end section 84 has a smaller inner diameter that engages the outer surface of the push pin 76 and the second end section 85 of the tubular body 80 has the larger outer diameter that engages the inner surface of the pole piece aperture.

A plastic enclosure 86 is molded around the electric actuator 56 and projects outwardly there from. An electrical connector 88 is formed at the remote end of the projecting section of the enclosure. The electrical connector 88 has a pair of terminals 87 projecting through a resilient gasket 89 and connected to the solenoid coil 58 by wires 59. The resilient gasket 89 provides seal that prevent water from entering the valve between the terminals 87 and the plastic body 86 and also prevents pressurized oil that may travel along the wires 59 from exiting the valve.

Figure 3:
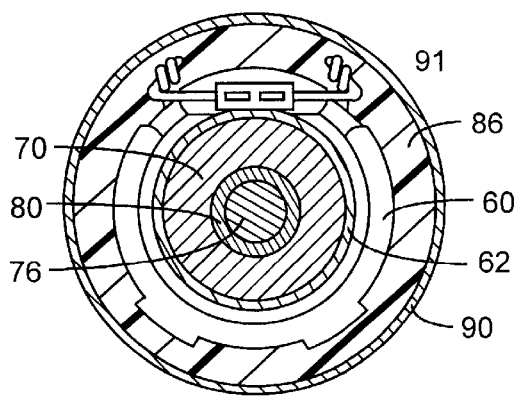
FIG. 3 is a cross section view through the electrohydraulic valve along line 3—3 in FIG. 2.
Figure 7:
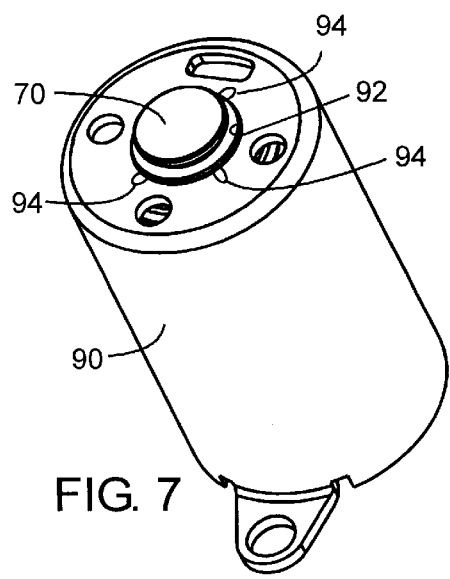
FIG. 7 is an isometric view of a housing and actuator subassembly of the electrohydraulic valve.

With reference to FIGS. 2 and 3, a metal outer housing 90 extends around that portion of the plastic enclosure 86 which encapsulates the electrical actuator 56. The lower end of the outer housing 90 in the orientation of the valve in FIG. 2 tightly engages the outer diameter of the flange 68 on the C-pole piece 64 and is crimped at 91 around the upper edge of the tubular valve body 40. The upper end of the outer housing 90 has a central aperture 92 through which the end-pole piece 70 extends as seen in FIG. 7. The edge of that central aperture 92 is has a plurality of indentations 94 at which the material of the enclosure is force against the end-pole piece 70 to stake those two components together. The tight engagement of the C-pole piece 64 with the outer housing 90 provides a highly conductive flux path for the solenoid actuator, as well as holding those components together during subsequent assembly operations.

References herein to directional relationships and movement, such as upper and lower or up and down, refer to the relationship and movement of the components in the orientation illustrated in the drawings, which may not be the orientation of the components as attached to machinery.

Referring again to FIG. 2, during fabrication of the valve 30, the assembled actuator 56 is placed in a mold into which molten plastic for the enclosure 86 is injected. That molten plastic is forced into the gap between the outer housing 90 and the bobbin/solenoid coil subassembly where that plastic bonds to the bobbin 60 to encapsulate the solenoid coil 58. Thus the molded enclosure 86 upon hardening provides a hermetic seal that prevents water from penetrating to the solenoid coil 58 and producing a short circuit to the exposed outer housing 90.

When the electrohydraulic control valve 30 is not being activated by electric current applied to the solenoid coil 58, the spring 50 forces the spool 44 into a position at which the annular notch 46 provides a fluid path between the inlet port 26 and the first port 24 leading to the first manifold passage 18. In this de-energized state, the inner end of the spool 44 is retracted upward which opens a path between the outlet port 27 and the second port 21 communicating with the second manifold passage 19. Pressurized engine oil now is fed through to port 18 of the cam phasing mechanism 12 and oil is drained from that mechanism's second port 20 to the oil pan, thereby advancing the valve timing.

From the de-energized state, application of a relatively small magnitude electric current to the solenoid coil 58 produces movement of the armature cylinder 74 and push pin 76 toward the valve body 40. That motion also moves the spool 44 thereby reducing the size of the fluid paths described immediately above. This decreases the flow of engine oil to the cam phasing mechanism 12 which reduces the rate at which the valve timing is being changed.

Application of a greater magnitude electric current to the solenoid coil 58 eventually moves the spool 44 downward in FIG. 2 into an intermediate position at which the path between the second port 25 and the outlet port 27, via the spool's central aperture 48, is closed. The annular spool notch 46 now extends between the first port 24 and the second port 25, thereby applying pressurized engine oil received at the inlet port 26 to both the first and second ports 24 and 25 connected to the cam phasing mechanism 12. This stops movement of the cam phasing mechanism 12 fixing the relationship between the crankshaft and the cam shaft on the engine.

Figure 8:
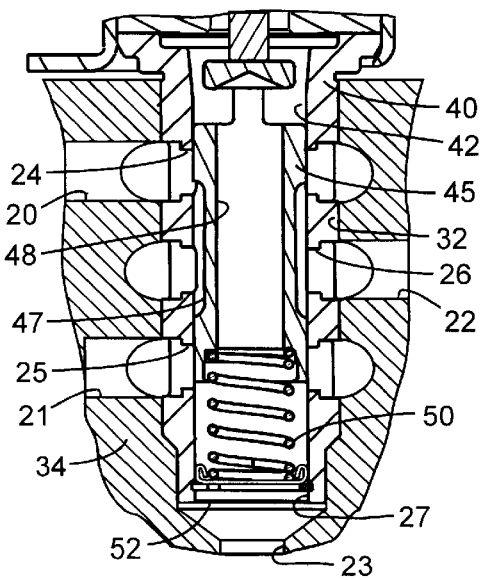
FIG. 8 is a cross section view of an alternative valve spool for the electrohydraulic valve.

An alternative spool 45 is shown in FIG. 8 in which the notch 47 in the exterior surface is shorter than the notch 46 in the spool 44 in FIG. 2. Thus when the spool is moved to the intermediate position in the bore 32, neither the first or second ports 24 or 25 the is connected to the inlet port 26. In the intermediate position the short notch 47 is centered over the inlet port 26 and the two ends fall on the lands between the inlet port and the first and second ports. Furthermore the outlet port 27 also is closed off from the first and second ports 24 and 25. This alternative spool 45 provides a center off position in which fluid can not flow to or from the cam phasing mechanism 12. Otherwise the alternative spool 45 spool provides the same fluid path connections as the first embodiment of a spool 44.

Referring again to FIG. 2, applying a still greater magnitude electric current to the solenoid coil 58 eventually moves the spool 44 farther downward into a position where the first port 24 communicates with the central aperture 48 through the spool 44. This opens a fluid path between the first port 24 and the outlet port 27. In this position the annular notch 46 of the spool provides a path between the inlet port 26 and only the second port 25 that leads to the second port 19 of the cam phasing mechanism 12. This applies pressurized engine oil to the mechanism's second port 19 and drains the oil from the mechanism's first port 18 to the oil pan, thereby retarding the phase relationship between the cam and crank shafts. The size of the openings between these passages is varied by controlling the magnitude of the electric current applied to the solenoid coil 58 to meter the flow of engine oil and thus control the rate at which valve timing changes.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An electrohydraulic valve for controlling an internal combustion engine, said electrohydraulic control valve comprising:

a tubular valve body having a longitudinal bore there through forming an outlet port at one end of the valve body, and having with a first port, a second port and an inlet port extending transversely through the body in communication with the longitudinal bore;

a spool slidably received within the bore of the valve body and having an aperture extending from an end of the spool that is proximate to the one end of the valve body to a point proximate an opposite end of the spool, the spool including an notch in an exterior surface;

a spring which biases the spool away from the one end of the valve body; and an actuator having a solenoid coil wound on an annular bobbin, a first pole piece extends into one end of the bobbin and has a first aperture, a second pole piece extends into another end of the bobbin and has a second aperture, the actuator further including a first bushing in the first aperture and a second bushing in the second aperture, each of the first and second bushings having a tubular body with a first end section that has a larger outer diameter than a second end section and wherein the second end section has a smaller inner diameter than the first end section, the actuator additionally having an armature is slidably received in the first and second bushings and engaging the spool;

wherein, in response to forces from the spring and the armature, the spool moves into one of a first position where the second port is in fluid communication with the outlet port and the first port is in fluid communication via the notch with the inlet port, and a sec and position where the inlet port is in fluid communication via the notch with the second port and the aperture provides a fluid path between the first port and the outlet port.

2. The electrohydraulic valve as recited in claim 1 further comprising the spool having an intermediate position between the first position and the second position wherein in the intermediate position the notch provides an interconnection of the first port, the Second port and the inlet port.

3. The electrohydraulic valve as recited in claim 1 wherein the spool has an intermediate position between the first position and the second position in which intermediate position thee first port and the second port are disconnected from the inlet port and the outlet port.

4. The electrohydraulic valve as recited in claim 1 further comprising:
   a metal housing around the actuator and secured to the valve body; and
   an enclosure of a plastic extending between the metal housing and the actuator and hermetically sealed to the bobbin, the housing having a portion that projects outward from the housing and has an electrical terminal formed therein.

5. The electrohydraulic valve as recited in claim 4 wherein metal housing is staked to the first pole piece.

6. The electrohydraulic valve as recited in claim 4 wherein the portion of the housing has an electrical connector formed therein.

7. The electrohydraulic valve as recited in claim 4 wherein the portion of the housing has an electrical connector comprises an electrical terminal and a gasket sealing an interface between the electrical terminal and the housing.

8. The electrohydraulic valve as recited in claim 4 wherein the enclosure is formed by injecting the plastic between the metal housing and the actuator.

9. The electrohydraulic valve as recited in claim 1 herein the actuator further comprises a tube of an electrically conductive, non-magnetic metal between the bobbin and each of the first and second pole pieces.

10. The electrohydraulic valve as recited in claim 9 wherein the tube of the actuator is formed from a material selected from the group consisting of copper and bronze.

11. The electrohydraulic valve as recited in claim 1 wherein the first and second bushings are formed from an aluminum bronze alloy.

12. An electrohydraulic valve for controlling an internal combustion engine, said electrohydraulic control valve comprising:
   a tubular valve body having a longitudinal bore there through forming an outlet port at one end of the valve body, and having with a first port, a second port and an inlet port extending transversely through the body in communication with the longitudinal bore;
   a spool slidably received within the bore of the valve body and having an aperture extending from an end of the spool that is proximate to the one end of the valve body to a point proximate an opposite end of the spool, the spool including an notch in an exterior surface;
   a spring biasing the spool away from the one end of the valve body; and
   an actuator having a solenoid coil wound on an annular bobbin with a tube of an electrically conductive, non-magnetic metal within the bobbin, a first pole piece extends into one end of the tube and has a first aperture, a second pole piece extends into another end of the tube and has a second aperture, the actuator further including a first bushing in the first aperture and a second bushing in the second aperture, each of the first and second bushings having a tubular body with a first end section that has a larger outer diameter than a second end section and wherein the second end section that has a smaller inner diameter than the first end section, the actuator additionally having an armature slidably received in the first and second bushings and engaging the spool;
   wherein in response to forces from the spring and the armature, the spool moves into a first position where a first fluid path is provided between the second port and the outlet port and where the notch provides a second fluid path between the first port and the inlet port, and a second position where the notch provides a third fluid path fluid path between the inlet port and the second port and where the aperture provides a fourth between the first port and the outlet port.

13. The electrohydraulic valve as recited in claim 12 wherein the spoof has an intermediate position between the first position and the second position in which intermediate position the notch provides an interconnection of the first port, the second port and the inlet port.

14. The electrohydraulic valve as recited in claim 12 wherein the spool has an intermediate position between the first position and the second position in which intermediate position the first port, and the second port are disconnected from the inlet port and the outlet port.

15. The electrohydraulic valve as recited in claim 12 further comprising:
   a metal housing around the actuator and secured to the valve body; and
   an enclosure of a plastic extending between the metal housing and the actuator and hermetically scaled to the bobbin, the housing having a portion that projects outward from the housing and has an electrical terminal formed therein.

16. The electrohydraulic valve as recited in claim 12 wherein the tube of the actuator is formed from a material selected from the group consisting of copper and bronze.

17. The electrohydraulic valve as recited in claim 12 wherein the first and second bushings are formed from an aluminum bronze alloy.

18. An electrohydraulic valve for controlling an internal combustion engine, said electrohydraulic control valve comprising:
   a tubular valve body having a longitudinal bore there through forming an outlet port at one end of the valve body, and having with a first port, a second port and an inlet port extending transversely through the body in communication with the longitudinal bore;
   a spool slidably received within the bore of the valve body and having an aperture extending from an end of the spool that is proximate to the one end of the valve body to a point proximate an opposite end of the spool, the spool including an notch in an exterior surface;
   a spring biasing the spool away from the one end of the valve body; and
   an actuator having a solenoid coil wound on an annular bobbin with a tube of an electrically conductive, non-magnetic metal within the bobbin, a first pole piece extends into one end of the tube and has a first aperture, a second pole piece extends into another end of the tube and has a second aperture, the actuator further including a first bushing in the first aperture and a second bushing in the second aperture, each of the first and second bushings having a tubular body with a first end section that has a larger outer diameter than a second end section and wherein the second end section that has a smaller inner diameter than the first end section, the actuator additionally having an armature is slidably received in the first and second bushings and engaging the spool;
   a metal housing around the actuator and secured to the valve body; and
   an enclosure of a plastic extending between the metal housing and the actuator and hermetically sealed to the bobbin;

wherein in response to forces from the spring and the armature, the spool moves into a first position where a first fluid path is provided between the second port and the outlet port and where the notch provides a second fluid path between the first port and the inlet port, and a second position where the notch provides a third fluid path fluid path between the inlet port and the second port and where the aperture provides a fourth between the first port and the outlet port.

19. The electrohydraulic valve as recited in claim 18 wherein the spool has an intermediate position between the first position and the second position in which intermediate position the notch provides an interconnection of the first port, the second port and the inlet port.

20. The electrohydraulic valve as recited in claim 18 wherein the spool has an intermediate position between the first position and the second position in which intermediate position the first port and the second port are disconnected from the inlet port and the outlet port.

21. The electrohydraulic valve as recited in claim 18 wherein metal housing is staked to the first pole piece.

22. The electrohydraulic valve as recited in claim 18 wherein the tube of the actuator is formed from a material selected from the group consisting of copper and bronze.

23. The electrohydraulic valve as recited in claim 18 wherein the first and second bushings are formed from an aluminum bronze alloy.

* * * * *